Aug. 19, 1947.  E. O. MUELLER  2,426,042
COMMUTATOR
Filed July 20, 1944
Old
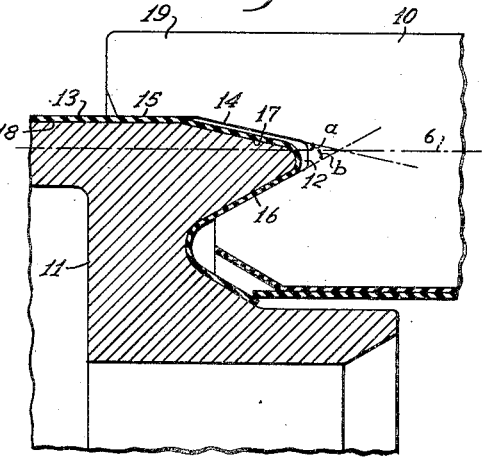
Fig. 2.
New
WITNESSES:
Edward Michaels
F. P. Lyle
INVENTOR
Erich O. Mueller.
BY O. B. Buchanan
ATTORNEY Patented Aug. 19, 1947

2,426,042

UNITED STATES PATENT OFFICE 2,426,042

COMMUTATOR

Erich O. Mueller, Irwin, Pa., assignor to Westinghouse Electric Corporation, East Pittsburgh, Pa., a corporation of Pennsylvania Application July 20, 1944, Serial No. 545,752

2 Claims. (Cl. 171—320)

The present invention relates to commutators for dynamoelectric machines, and more particularly to commutators of the V-ring type.

In commutators of this type, the commutator cylinder is clamped together by means of steel V-rings engaging in V-grooves in the ends of the copper commutator bars. The diverging sides of the V-grooves form inner and outer angles with the axis of the commutator cylinder, or with a line parallel to the axis, the inner angle being the one formed by the radially inner side of the V-groove, and the outer angle being the angle formed by the radially outer side of the V-groove. The diverging conical surfaces of the V-ring form corresponding angles with the axis of the commutator cylinder. The inner angle of the V-grooves and V-rings determines the necessary axial assembly force required to clamp the commutator together, since the radial component of the clamping force becomes relatively greater as the inner V-angle decreases, so that a smaller axial force is required to obtain a given radial force on the commutator bars as the inner angle is decreased. Thus, a relatively small inner V-angle is desirable. The outer angle determines the strength of the V-ring, for a given inner angle, since the strength increases as the total angle, that is, the sum of the inner and outer angles, increases, and it has been found that a total angle of from 33° to 36° is desirable, although larger angles might sometimes be advantageous in permitting the use of a lower grade of steel with resultant saving in cost.

The most desirable design, therefore, would be one having a relatively small inner angle to reduce the necessary axial assembly force, and a relatively large outer angle to provide the necessary strength for the V-ring. There are certain practical difficulties, however, which have greatly limited the permissible size of the outer angle, especially in arch-bound commutators which also have a certain amount of V-binding. In an arch-bound commutator, the bars are clamped or bound together by tangential pressure between the bars produced by the radial force exerted on the wedge-shaped bars, which tends to draw them radially inward toward the axis of the commutator cylinder. In a V-bound commutator, part or all of the clamping action is effected by radial pressure between the outer surface of the V-rings and the ends of the commutator bars. V-binding is produced by machining the V-grooves and V-rings so that a certain predetermined amount of interference will exist when they are assembled with the mica insulation between them. In other words, the V-rings are made slightly oversize, or with a slightly greater outer angle than that of the V-grooves, so that when the ring is forced into the grooves, a radial force is produced between the ring and the ends of the commutator bars, the magnitude of the force depending on the amount of interference.

The amount of V-binding must be closely controlled in order to obtain good results, especially when it is used in combination with arch-binding, as is often done. In order to obtain close control of the V-binding, the engaging outer surfaces of the V-rings and V-grooves must be very accurately machined with respect to the inner surfaces, since the engaging surfaces of the V-rings and grooves must engage in exactly the right relation to obtain the desired amounts of arch-binding and V-binding, and it will be obvious that if the outer V-angle is large, the necessary accuracy of machining will be much more difficult to obtain. After the commutator is assembled, it must be seasoned by undergoing repeated cycles of heating and tightening. During the seasoning process, the V-rings move farther into the grooves, and the amount of interference increases by a more or less uncertain amount. Obviously, if the outer V-angle is large there will be a greater increase in this uncontrolled interference, and the difficulty of controlling the amount of V-binding becomes much greater. These difficulties are also encountered in the case of arch-bound commutators in which no V-binding is used, since it is necessary to closely control the small clearance between the outer surfaces of the V-rings and V-grooves which is provided in this type of commutator. For these reasons, therefore, in the conventional commutator designs which have been used heretofore, it has been necessary to limit the outer V-angle to from 3° to 6°, and the inner angle has usually been made about 30°, although as pointed out above a larger outer angle and a smaller inner angle would usually be more desirable.

The principal object of the present invention is to provide a commutator of the V-ring type in which the outer V-angles can be made larger, and the inner V-angles can be made smaller, than has previously been possible, and in which the amount of radial V-binding pressure between the V-rings and the commutator bars can be more closely controlled than heretofore.

More specifically, the object of the invention is to provide a commutator of the V-ring type in which the outer V-angle is made relatively large at the bottom of the V-groove, so as to permit a reduction in the inner V-angle to obtain a reduced assembly pressure, or an increase in the total angle to obtain a stronger V-ring, and in which the engaging portions of the outer V-ring surfaces and the outer sides of the V-grooves have an angle of substantially zero, so that the amount of V-binding can be accurately controlled by reducing the difficulty of machining and eliminating the uncontrolled increase in V-binding pressure during seasoning.

Other objects and advantages of the invention will be apparent from the following detailed description, taken in connection with the accompanying drawing, in which:

Fig. 2 is a similar diagrammatic view showing a design embodying the present invention.

Figure 1:
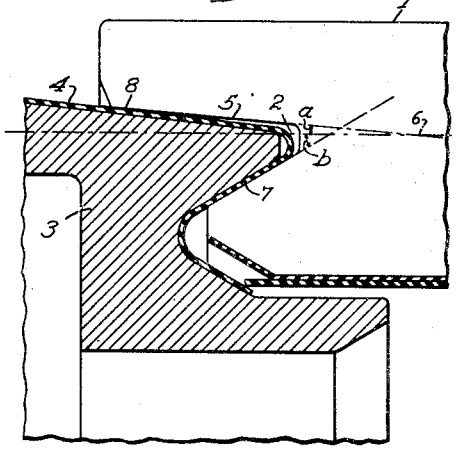
Figure 1 is a somewhat diagrammatic view of one end of a commutator bar engaged by its V-ring, showing a typical design of the conventional practice.

Fig. 1 shows diagrammatically one end of a commutator bar 1 having a V-groove 2 in its end. A V-ring 3 is engaged in the V-groove 2 to clamp the commutator cylinder, which comprises a plurality of bars 1, and the V-ring 3 is insulated from the commutator bars by a mica V-ring 4. The commutator bar 1 and V-ring 3 shown in Fig. 1 are designed in accordance with the conventional practice of the prior art. Thus, the outer angle $a$, formed by the radially outer side 5 of the V-groove 2 and a reference line 6 parallel to the axis of the commutator cylinder, is shown as being about 6°, which is about the greatest permissible angle which could be used in the prior practice. The inner angle $b$, formed by the radially inner side 7 of the V-groove 2 and the reference line 6, is shown as being about 30°, which has been the standard practice.

The structure shown in Fig. 1 is that of an arch-bound commutator having a certain amount of V-binding, and the outer angle of the V-ring 3 is shown as being slightly greater than the outer angle $a$ of the V-groove, so that there is a certain amount of interference in the neighborhood of the point 8, producing a radial V-binding pressure at this point. It will be apparent that in order to control the radial pressure at the point 8, the engaging surfaces of the V-ring and V-groove must be very accurately machined, and the relation between the inner and outer surfaces must be exactly correct, so that the ring will engage in the groove in the proper relation, and that an increase in the angle $a$ would increase the difficulty of obtaining the required accuracy in machining. It will also be apparent that when the commutator is seasoned after assembly, and the V-ring 3 moves farther into the groove 2, the pressure at the point 8 will increase by a more or less indeterminate amount, which makes it extremely difficult to control the amount of this radial pressure with the desired accuracy, and that this difficulty increases if the angle $a$ is increased.

Since the angle $a$ is limited to a relatively small size by the considerations just mentioned, the magnitude of the angle $b$ is necessarily determined chiefly by the necessary strength of the V-ring, which depends on the total angle, that is, the sum of the angles $a$ and $b$. The tangential arch-binding pressure between the commutator bars is produced by the radial component of the axial force applied to the V-ring 3 to force it into engagement with the commutator bars, and the magnitude of the radial component with respect to the axial force depends on the angle $b$. Thus, if the angle $b$ were reduced, a greater radial clamping force could be obtained for the same axial force, or the axial force could be reduced to obtain a given radial clamping force. In the prior practice illustrated in Fig. 1, however, it has not been possible to select the inner angle $b$ on the basis of these considerations, because of the limitations discussed above on the magnitude of the outer angle and the necessity for adequate strength of the V-ring.

The present invention overcomes the difficulties just discussed by means of the design shown in the diagram of Fig. 2. This figure shows one end of a commutator bar 10 with a V-ring 11 engaging the V-groove 12 in the end of the bar 10 and insulated from it by a mica V-ring 13. In this construction, the outer V-angle $a$ at the bottom of the V-groove 12 is made considerably larger than the maximum outer angle which was permissible in the prior practice, and in fact may be made as large as desired. The other end of the outer side of the V-groove 12, adjacent the end of the commutator bar 10, has an angle of substantially zero, or, in other words, is substantially parallel to the axis of the commutator cylinder, or the reference line 6. Thus, the outer side of the V-groove 12 consists of a portion 14 adjacent the bottom of the groove, which forms a relatively large outer angle $a$ with the reference line 6, and a portion 15 adjacent the end of the bar 10, which is substantially parallel to the line 6. The inner side 16 of the V-groove, which forms the inner angle $b$, is continuous as in the prior practice, but the angle $b$ is not limited by considerations of strength of the V-ring, as was formerly the case. The V-ring 11 corresponds in shape to the V-groove 12, so that its outer surface has a conical portion 17, corresponding to the conical surface formed by the portions 14 of the bars 10, and a cylindrical portion 18, corresponding to the cylindrical surface formed by the portions 15 of the bars 10.

With the new construction, the inner angle $b$ can be made smaller than has previously been possible, if desired, so as to reduce the necessary axial assembly force without sacrifice in strength of the V-ring, and the total angle $a$ plus $b$ can be made as large as desired to increase the strength of the V-ring, or to permit the use of a lower grade of steel, by using a relatively large outer angle $a$. Since the engaging outer surfaces of the V-ring and V-groove are cylindrical, the problem of accurately machining these surfaces is greatly simplified, since an accurate cylindrical surface can readily be produced, and thus the amount of V-binding, or radial pressure between the cylindrical surfaces of the ring and groove can more accurately be controlled. With the new construction there is no increase in V-binding pressure during seasoning, since the engaging surfaces are cylindrical and the V-ring can move farther into the V-groove without increasing the radial pressure. Thus, the new construction makes it possible to control the V-binding pressure much more accurately than has been possible heretofore, and at the same time permit greater freedom of design, since the inner and outer V-angles are not limited as in the previous constructions, but may be chosen over a relatively wide range to obtain lower assembly pressures or increased V-ring strengths.

It will be seen, therefore, that the construction illustrated in Fig. 2 has many advantages, as the machining of the V-rings and commutator bars is simplified, and the V-binding can be more accurately controlled. These advantages are also obtained in the case of a fully arch-bound commutator in which no V-binding is used, since the small cylindrical clearance required in this type of commutator between the end of the commutator bar and the outer surface of the V-ring can be accurately controlled and an external seal can be easily applied. The assembly of either type of commutator is facilitated since the mica V-ring 13 can be molded on the steel V-ring 11 and the cylindrical portion ground to accurate size to insure uniform thickness and correct diameter. The cylindrical portion of the mica V-ring 13 can also be made somewhat thicker than the conical parts, if desired, in order to obtain a cushioning effect, which also assists in accurate control of the V-binding. In cases where insufficient V-binding is obtained, the radial pressure can readily be increased by inserting a cylindrical mica shim between the bar and the V-ring, which is much easier than inserting the tapered shims which have previously been used for this purpose. The construction of the present invention also has another important advantage in that the increase of the outer V-angle a increases the thickness of the extending portion 19 of the commutator bar 10 adjacent the bottom of the V-groove 12, relative to the thickness at the end of the bar, as can readily be seen by comparison of Figs. 1 and 2. Since the portion 19 of the bar acts as a cantilever beam, this redistribution of its mass reduces the stress in the copper at the bottom of the V-groove.

Figure 3:
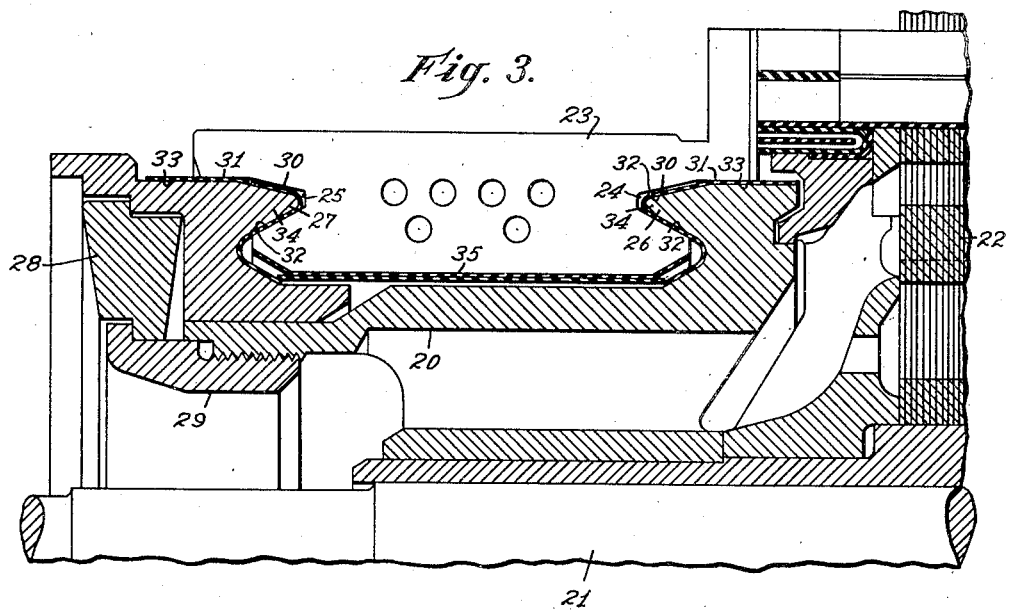
Fig. 3 is a longitudinal sectional view of a typical commutator assembly embodying the present invention.

Fig. 3 shows a typical commutator assembly embodying the present invention. The particular assembly shown in the drawing embodies the spring-clamped commutator construction disclosed and claimed in a patent to W. A. Brecht No. 2,221,571, issued November 12, 1940, and assigned to Westinghouse Electric & Manufacturing Company. This construction includes a commutator spider 20 mounted on a shaft 21 of a dynamo-electric machine adjacent the armature 22. The commutator cylinder consists of a plurality of commutator bars 23 having V-grooves 24 and 25 in their ends and clamped between V-rings 26 and 27 engaging in the V-grooves 24 and 25, respectively. The V-ring 26 is shown as being integral with the spider 20, but it could equally well be a separate element. The V-ring 27 is slidably mounted on the commutator spider 20 and the bars 23 are yieldably clamped between the V-rings by means of a spring ring 28, which is drawn against the V-ring 27 by a ring nut 29 threaded into the commutator spider 20. Thus the commutator cylinder is yieldably clamped by the spring pressure of the spring ring 28, so that it can expand and contract in response to temperature changes without affecting the clamping pressure, as more fully explained in the above-mentioned patent.

The V-grooves 24 and 25 have outer sides consisting of an angular portion 30, which forms a relatively large outer V-angle, and a portion 31 parallel to the axis of the commutator. The V-rings 26 and 27 are correspondingly shaped, with divergent conical surfaces 32, and with outer cylindrical surfaces 33 for engaging the cylindrical portions 31 of the V-grooves. The V-rings are insulated from the commutator bars by mica V-rings 34, and the commutator bars may be insulated from the spider 20 by means of a mica bushing 35. Thus, the commutator bars 23 are clamped between the V-rings 26 and 27, which have inner conical surfaces 32 engaging the conical surfaces formed by the inner sides of the V-grooves 24 and 25 to produce the desired amount of arch-binding by the radial pressure exerted in this way on the commutator bars, and the V-rings also have cylindrical portions 33 engaging the cylindrical surfaces formed by the portions 31 of the outer sides of the V-grooves 24 and 25 to provide the desired amount of V-binding which, as explained above, can be more accurately controlled than was possible in previous designs. In case no V-binding is used, of course, a small cylindrical clearance is provider between the cylindrical surfaces 33 and the V-rings and the cylindrical portions 31 of the V-grooves.

A preferred embodiment of the invention has been shown and described for the purpose of illustration, but it is to be understood that the invention is not restricted to the specific details of arrangement shown, and is capable of various modifications. The invention, therefore, is not limited to the particular arrangement shown, but in its broadest aspect it includes all equivalent modifications and embodiments which come within the scope of the appended claims.

I claim as my invention:

1. A commutator cylinder for a dynamo-electric machine, said commutator cylinder comprising a plurality of commutator bars having V-grooves in both ends thereof and V-rings engaging in said V-grooves to clamp the commutator cylinder together, the V-grooves having diverging inner and outer sides, the inner side of each V-groove making an acute angle with a line parallel to the axis of the commutator cylinder, and the outer side of each V-groove having a portion adjacent the bottom of the groove which makes an acute angle with a line parallel to the axis of the commutator cylinder and having a portion adjacent the end of the commutator bar which is substantially parallel to the axis of the commutator cylinder, said V-rings having diverging inner and outer surfaces, the inner surfaces being conical to engage the inner sides of the V-grooves with a predetermined pressure, and the outer surfaces of the V-rings having a conical portion and a substantially cylindrical portion adapted to engage the end portions of the outer sides of the V-grooves with a predetermined, substantially constant pressure therebetween, the V-rings being proportioned so that they do not engage the bottoms of the V-grooves and so that the conical portions of their outer surfaces do not engage the angular portions of the outer sides of the V-grooves.

2. A commutator cylinder for a dynamo-electric machine, said commutator cylinder comprising a plurality of commutator bars having V-grooves in both ends thereof and V-rings engaging in said V-grooves to clamp the commutator cylinder together, the V-grooves having diverging inner and outer sides, the inner side of each V-groove making an acute angle with a line parallel to the axis of the commutator cylinder, and the outer side of each V-groove having a portion adjacent the bottom of the groove which makes an acute angle with a line parallel to the axis of the commutator cylinder and having a portion adjacent the end of the commutator bar which is substantially parallel to the axis of the commutator cylinder, said V-rings having diverging inner and outer surfaces, the inner surfaces being conical to engage the inner sides of the V-grooves with a predetermined pressure, and the outer surfaces of the V-rings having a conical portion and a substantially cylindrical portion corresponding to the end portions of the outer sides of the V-grooves, the V-rings being proportioned so that they do not engage the bottoms of the V-grooves and so that the conical portions of their outer surfaces do not engage the angular portions of the outer sides of the V-grooves.

ERICH O. MUELLER.

REFERENCES CITED

The following references are of record in the file of this patent:

UNITED STATES PATENTS

| Number | Name | Date |
|---|---|---|
| 678,171 | Geisonhoner | July 9, 1901 |
| 1,292,590 | Eaton | Jan. 20, 1919 |